United States Patent [19]

Karl et al.

[11] 4,382,664

[45] May 10, 1983

[54] MECHANISM FOR TRANSPORTING A SLIDE FROM A LONG MAGAZINE INTO THE OPTICAL CHANNEL OF A SLIDE PROJECTOR

[75] Inventors: Leopold Karl, Wurzburg; Manfred Batz, Eibelstadt; Herbert Wundling, Oschsenfurt, all of Fed. Rep. of Germany

[73] Assignee: Kindermann & Co. GmbH, Ochsenfurt, Fed. Rep. of Germany

[21] Appl. No.: 297,328

[22] Filed: Aug. 28, 1981

[30] Foreign Application Priority Data

Sep. 12, 1980 [DE] Fed. Rep. of Germany ....... 3034553

[51] Int. Cl.³ ............................................. G03B 23/04
[52] U.S. Cl. .................................... 353/111; 353/103; 353/116; 40/361; 40/366
[58] Field of Search ........ 206/456; 353/103, 111–117, 353/122; 40/361, 362, 366, 367

[56] References Cited

U.S. PATENT DOCUMENTS

| | | | |
|---|---|---|---|
| 2,364,788 | 12/1944 | Harvey et al. | 353/114 |
| 3,353,667 | 11/1967 | Hall | 206/456 |
| 3,704,943 | 12/1972 | Rube | 353/117 |
| 4,105,317 | 8/1978 | Sobotta | 353/117 |

*Primary Examiner*—Stephen Marcus
*Assistant Examiner*—William Sharp
*Attorney, Agent, or Firm*—Weingarten, Schurgin, Gagnebin & Hayes

[57] ABSTRACT

Apparatus is disclosed for viewing photographic slides carried in a long magazine by a slide projector which is configured to accept only a circular slide magazine or carrousel. This invention provides a simple and efficient mechanism for using long magazines with a circular magazine projector without the need of first transferring by hand all of the slides from the long magazine into a circular magazine. An attachment adapted to be fastened to the projector housing has a covered channel for accepting and advancing a long magazine inserted therein. Adjacent the long magazine within the attachment is an intermediate storage tray which contains slide compartments and which is moved synchronously with the long magazine. Slanting guide rails extend from the long magazine to the intermediate storage tray, and these rails individually transfer the slides from the long magazine into the storage tray as the long magazine is advanced. Each slide is individually placed in a position over a chute in the base of the attachment through which the slide drops into the optical channel of the projector. Once the slide has been returned to the storage tray from the optical channel of the projector, the slide is returned by the guide rails from the storage tray to the long magazine.

8 Claims, 2 Drawing Figures

MECHANISM FOR TRANSPORTING A SLIDE FROM A LONG MAGAZINE INTO THE OPTICAL CHANNEL OF A SLIDE PROJECTOR

FIELD OF THE INVENTION

This invention relates generally to slide projectors and more particularly concerns a mechanism for the transfer of slides from a long magazine into the optical channel of a slide projector.

BACKGROUND OF THE INVENTION

Two types of projectors are currently in use for the viewing of photographic slides, and these two types differ from each other essentially in the type of slide magazine used. One type uses a long magazine and the other type uses a circular magazine or carrousel. Long magazine projectors have a channel for lengthwise advancement of a long magazine, and include a driving pinion which extends into the channel and, with suitably disposed teeth, meshes with a rack or teeth provided on the long magazine. The long magazine is advanced one compartment at a time by stepwise rotation of this driving pinion. For injecting individual slides or slide frames into the optical channel of the projector, a gripping element generally is provided which grips a slide in its rest position and draws or pushes the slide sideways out of its compartment in the long magazine and into the optical channel of the projector. After the slide has been viewed, it is returned sideways into its associated compartment in the long magazine by the gripping element.

Usually, instead of gripping elements, round magazine projectors use a so-called chute, through which a slide in the proper position falls into the optical channel and is returned to the magazine by a lifting mechanism after the slide is viewed.

Long magazine projectors are already known in which a round magazine can be employed in place of a long magazine. In such projectors, the round magazine is placed upright in the long magazine channel and the drive mechanism and the gripping elements are designed so that the round magazine is moved stepwise by the driving pinion and the slide or slide frame is transferred into the optical channel of the projector by the gripping element.

Prior to this invention, it had not been possible to use long magazines with round magazine projectors, which are preferred to the long magazine projectors since they have a simpler construction and are cheaper. The reason this was impossible was because of the special configuration of the drive element for the round magazine found in the round magazine projector which makes it impossible to transfer the individual slides out of a long magazine and into the optical channel of the projector.

SUMMARY OF THE INVENTION

One purpose of this invention is to provide a mechanism for transferring slides or slide frames from a long magazine into the optical channel of a round magazine projector and to provide therefor an automated operational cycle which functions in a desired manner.

In accordance with this invention, a long magazine attachment is provided on the projector housing which includes a partially covered channel for longitudinal advancement of a long magazine, an intermediate storage tray disposed alongside the long magazine and moved synchronously with the long magazine, and slanting guide rails for sideways movement of the slides out of the long magazine and into the intermediate storage tray to a position over a chute in the base of the attachment and then back again from the intermediate storage tray to the long magazine.

The long magazine and the intermediate storage tray are synchronously fed into the attachment in a stepwise manner and the individual slides are sequentially transferred by the slanting guide rails laterally out of the individual compartments of the long magazine and into the open compartments of the intermediate storage tray adjacent the long magazine and then to a position above the chute in the base of the attachment. The return of the individual slides to the long magazine takes place in a basically similar manner, in which the guide rails guide the slides from the position above the chute back to the long magazine compartments. This movement continues until all of the individual slides have been transferred first from the long magazine and into the intermediate storage tray and then returned to the long magazine.

A desirable feature of this invention is the simplicity of the mechanism, which is a result of the conversion of the longitudinal feed movement of the long magazine into a sideways or lateral movement of the individual slides from the long magazine into the intermediate storage tray by diagonal guide rails, and of the fact that no additional specially driven elements are required for this sideways movement.

Although the stepwise longitudinal feeding movement of the long magazine and of the intermediate storage tray could be produced by separate, coordinated gear drive systems, in a preferred embodiment of this invention the intermediate storage tray is coupled to the long magazine, so that the intermediate storage tray is advanced by the long magazine drive together with the long magazine. This coupling can be effected by a pin connection or by a simple cam fixture.

In order to be able to use long magazines of different lengths in one piece of equipment, the length of the intermediate storage tray and the number of its compartments should at least correspond respectively to the length and the number of compartments of the largest long magazine one would be likely to use.

Preferably, a guide slot having a width generally equal to that of the slides is disposed in a cover of the attachment and serves as a diagonal guide. The guide slot begins just above the long magazine and has an apex above the chute. Since in most long magazines, the upper ends of the slides may be pushed freely upwardly out of their individual compartments, the edge of the guide slot engages the edges of these upper ends of the slides and pushes the slides sideways out of the long magazine, after they have been raised from the bottom of the long magazine by an ascending ramp.

To reduce problems during operation, the base of the attachment is provided with a depression adjacent the chute. This depression is gradual with sloping sides to avoid jamming of the individual slides as the magazine is advanced.

The guiding of the slides into and out of the intermediate storage tray is facilitated by providing the guide rails with a spacing corresponding to the slide width. The guide rails are angled with respect to the direction of movement of the long magazine and extend from the long magazine to the intermediate storage tray toward the chute on the incoming side, and extend from the chute back to the long magazine to deliver the slides thereto on the outgoing side.

Preferably, the intermediate storage tray is designed as a frame in which the individual compartments are open on the bottom and on the side walls and in which these compartments meet and communicate with corresponding long magazine compartments, so that the transfer of the slides can take place without jamming or sticking thereof.

BRIEF DESCRIPTION OF THE DRAWING

The objects, advantages and features of this invention will be more clearly appreciated from the following detailed description taken in conjunction with the accompanying drawing in which.

DETAILED DESCRIPTION OF THE PREFERRED EMBODIMENT

Figure 1:
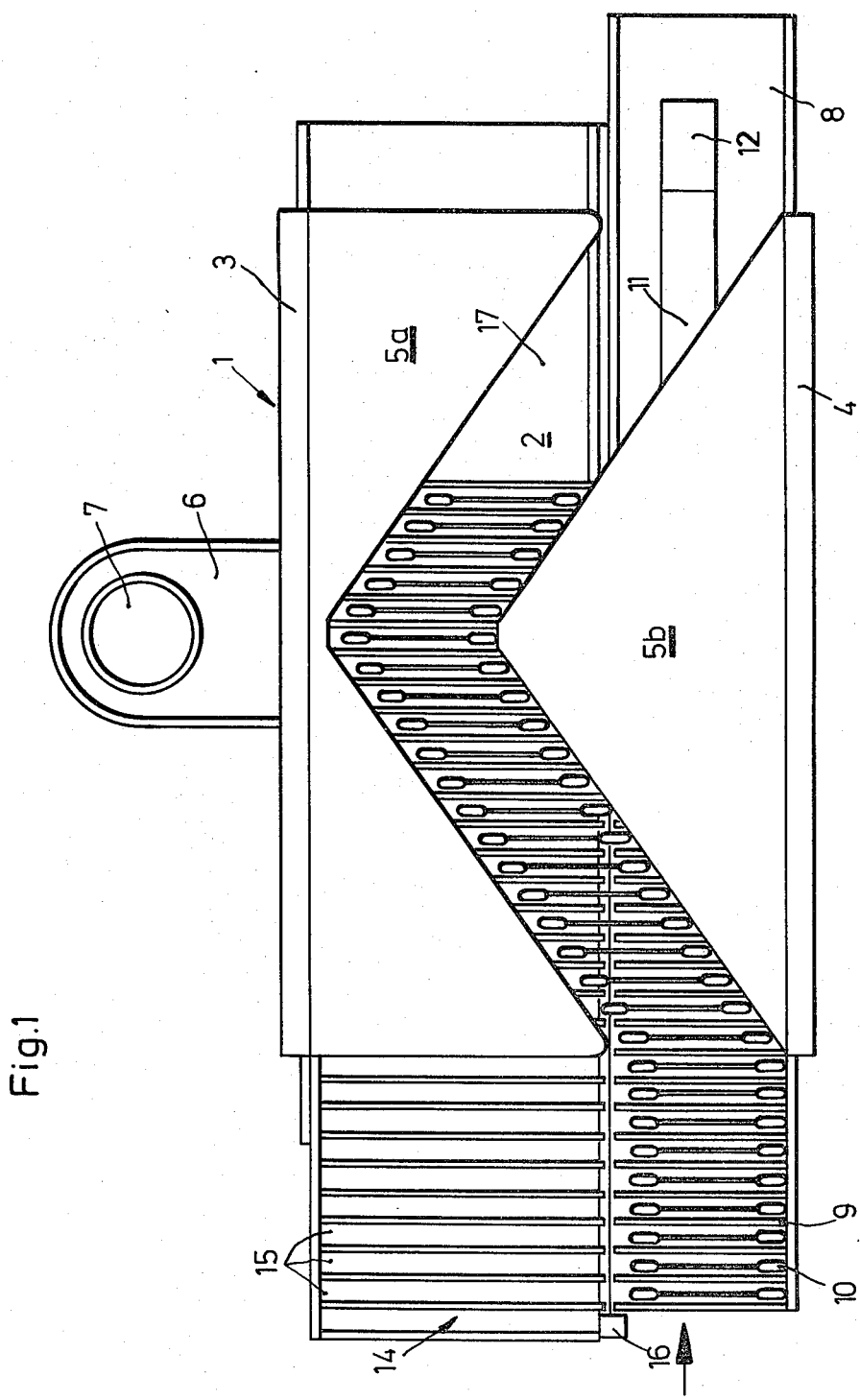
FIG. 1 is a top view of the mechanism according to this invention showing the intermediate storage tray and long magazine; and, FIG. 2 is a partial cross-section showing the mechanism of FIG. 1 without the attachment cover, intermediate storage tray or the long magazine.

With reference to FIG. 1, this invention includes a long magazine attachment 1, which includes a base 2, two vertical side walls 3 and 4 and cover parts 5a and 5b. The long magazine attachment is fastened to the projector housing so that a cross strut 6 is positioned and secured with its opening 7 in a centering holder normally used for round magazines.

In the long magazine attachment, a channel 8, which is partially enclosed by cover part 5b, is provided to accept a long magazine 9 containing slides 10. In this channel there is a ramp 11 having a slanting surface 12 and 13 on each end, and surfaces 12 and 13 each are inclined upwardly toward the center of ramp 11 and away from its ends. Surfaces 12 and 13 each enter a slot formed in the base of the long magazine provided for this purpose in a known manner. As the long magazine is advanced lengthwise, ramp 11 automatically lifts the upper edge of each slide upwardly out of the magazine by a preset amount.

As is evident from FIG. 1, there is an intermediate storage tray 14 adjacent the long magazine which is an open frame and which has a large number of individual compartments 15 which are open at the bottom. This intermediate storage tray 14 is coupled with the long magazine by pins 16, only one of which is shown in FIG. 1, so that as the long magazine is fed stepwise into channel 8 in the direction of the arrow in FIG. 1, intermediate storage tray 14 is also advanced synchronously therewith.

As shown in FIG. 1, an inclined guide slot 17 is formed between cover parts 5a and 5b, and the width of slot 17 transverse of the feed direction is generally equal to the width of a slide 10. With movement of the long magazine in the direction shown, the individual slides ride sideways into slot 17 in succession, as shown. Since the upper edges of the slides now extend upwardly above the long magazine, they are driven into contact with the edge of the guide slot 17 which pushes the slides out of the long magazine sideways as the long magazine moves in the direction of the arrow. The slides are thereby transferred into corresponding compartments 15 of the intermediate storage tray 14.

Figure 2:
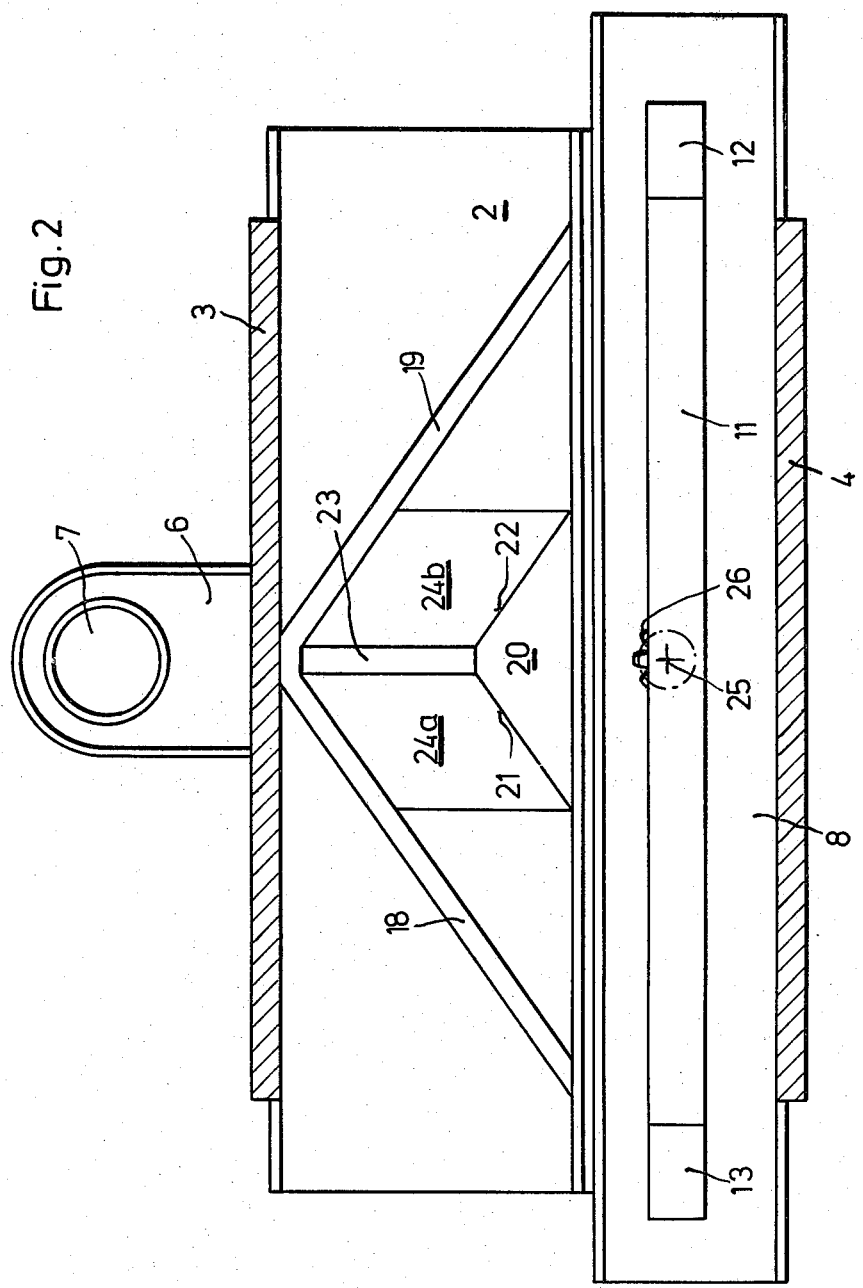

As shown in FIG. 2, guide rails 18 and 19 are guide part 20 are fastened to base 2 of the long magazine attachment 1. Guide rails 18, together with the slanting feed provided by guide edge 21 of guide part 20, form a guide path for the slides which is aligned with the inlet section of guide slot 17 in the cover. Guide rails 19, together with guide edge 22 of guide part 20, form a guide path which is aligned with the outlet section of guide slot 17 in the cover. In this way, the individual slides are guided along their upper and lower edges. A chute 23 is provided in base 2 of the long magazine attachment above the optical channel of the projector (not shown), through which slides found thereabove are dropped downwardly. In the vicinity of the chute there is a sloping depression with surfaces 24a and 24b, in base 2 of the attachment.

A shaft 25 is rotatably mounted in base 2 to drive the long magazine. Shaft 25 is provided with a driving pinion on the underside of the base and a gear wheel 26 in a recess of ramp 11 on the upper side of the base, both of which engage teeth on the long magazine in a known manner. In order to ensure the synchronous movement of long magazine 9 and intermediate storage tray 14 and to guide intermediate storage tray 14, a guide edge is provided on the side of the intermediate storage tray facing the long magazine. The guide edge extends into channel 8 and lies adjacent to a shoulder formed between channel 8 and the portion of the base which serves to advance and guide intermediate storage tray 14.

The above description is exemplary, and modifications and improvements are intended to fall within the scope of this invention as defined solely in the following claims.

What is claimed is:

1. A mechanism for transporting slides from a long magazine to an optical viewing area of a slide projector comprising:
    support means adapted to be secured to the slide projector and having a channel for insertion of the long magazine therein and for permitting longitudinal movement of the long magazine therealong, and having a chute adapted to be in communication with the optical viewing area of the slide projector;
    intermediate storage means having compartments adapted to accomodate the slides from the long magazine, said intermediate storage means being disposed adjacent and parallel to the long magazine when the long magazine is inserted in said channel on said support means;
    means for advancing the long magazine when the long magazine is inserted within said channel in a stepwise manner in a longitudinal direction parallel to the length of the long magazine; and
    means for sequentially guiding slides from the long magazine sideways to said compartments of said intermediate storage means and to a position above said chute, and for subsequently guiding slides sideways from said compartments of said intermediate storage means back to the long magazine.

2. The mechanism according to claim 1 wherein said intermediate storage means is coupled to the long magazine when the long magazine is disposed in said channel and is advanced sychronously therewith, said intermediate storage means having generally the same length and being adapted to accept the same number of slides as the long magazine.

3. A mechanism according to claim 1 or 2 further comprising:

a cover enclosing at least a portion of said channel; and a guide slot formed in said cover having a width transverse of the longitudinal direction of movement of the long magazine generally equal to the width of a slide in the long magazine, said guide slot extending generally parallel to said guide means.

4. The mechanism according to claim 1 or 2 further comprising a sloping depression in said support means adjacent said chute for delivering slides to said chute.

5. A mechanism according to claim 1 or 2 wherein said guide means comprise rails disposed on a base of said support means and spaced a distance transverse to the longitudinal direction of movement of the long magazine generally equal to the width of a slide in the long magazine, said rails extending at an angle with respect to the longitudinal direction of movement of the long magazine from said channel to said position above said chute in said intermediate storage means and thereafter from said position above said chute in said intermediate storage means to said channel.

6. The mechanism according to claim 2 wherein said intermediate storage means having compartments comprises:

a frame defining a large number of normally vertically oriented compartments opened at the bottom and adapted to accept slides;

a normally vertical backwall; and means disposed on a front side thereof in sliding engagement with said channel of said support means for producing movement of said intermediate storage means parallel and synchronous with the long magazine when the long magazine is inserted in said channel.

7. The mechanism according to claim 1 or 2 further comprising a ramp ascending upwardly toward the center of said channel of said support means in the longitudinal direction of movement of the long magazine for raising slides in the long magazine upwardly.

8. The storage mechanism according to any one of claims 1, 2 or 6 further comprising:

a shaft adjacent said channel of said support means;

a gear wheel attached to an upper end of said shaft and adapted to engage gearing means disposed on a long magazine when inserted into said channel; and means coupled to a lower end of said shaft for rotating said shaft about its axis to longitudinally advance the long magazine when disposed within said channel in a stepwise manner.

* * * * *

UNITED STATES PATENT AND TRADEMARK OFFICE
CERTIFICATE OF CORRECTION

PATENT NO. : 4,382,664

DATED : May 10, 1983

INVENTOR(S) : Leopold Karl, et al

It is certified that error appears in the above—identified patent and that said Letters Patent is hereby corrected as shown below:

Column 3, line 67    "are" should read --and--;

Column 4, line 42    "adpated" should read --adapted--;

Column 4, line 63    "sychronously" should read --synchronously--.

Signed and Sealed this

Twentieth Day of September 1983

[SEAL]

Attest:

GERALD J. MOSSINGHOFF

Attesting Officer

Commissioner of Patents and Trademarks